United States Patent
Vaisanen

(10) Patent No.: US 8,665,995 B2
(45) Date of Patent: Mar. 4, 2014

(54) DUAL CHANNEL TRANSMISSION

(75) Inventor: Risto Vaisanen, Salo (FI)

(73) Assignee: Nokia Corporation, Espoo (FI)

( * ) Notice: Subject to any disclaimer, the term of this patent is extended or adjusted under 35 U.S.C. 154(b) by 24 days.

(21) Appl. No.: 13/380,801

(22) PCT Filed: Jun. 23, 2009

(86) PCT No.: PCT/FI2009/050558
§ 371 (c)(1),
(2), (4) Date: Mar. 26, 2012

(87) PCT Pub. No.: WO2010/149822
PCT Pub. Date: Dec. 29, 2010

(65) Prior Publication Data
US 2012/0170682 A1    Jul. 5, 2012

(51) Int. Cl.
*H03C 3/00*    (2006.01)

(52) U.S. Cl.
USPC .......... 375/302; 375/211; 375/223; 375/271; 375/272

(58) Field of Classification Search
USPC ........ 375/260, 261, 265, 267, 295, 302, 306; 370/203, 204, 205, 208, 209, 210; 329/315; 332/117, 144; 398/187, 188
See application file for complete search history.

(56) References Cited

U.S. PATENT DOCUMENTS

| | | | |
|---|---|---|---|
| 6,668,024 B1 * | 12/2003 | Andre | .......................... 375/295 |
| 7,415,247 B1 | 8/2008 | Vaisanen et al. | |
| 2004/0152484 A1 | 8/2004 | Pratt | |
| 2006/0256216 A1 | 11/2006 | Takahiko et al. | |
| 2006/0281429 A1 | 12/2006 | Kishi et al. | |

FOREIGN PATENT DOCUMENTS

WO    01/39364 A1    5/2001

OTHER PUBLICATIONS

"UE Implementation Impact Due to DC-HSUPA", 3GPP TSG RAN WG1 Meeting #55bis, R1-090434, Agenda Item: 9, Qualcomm Europe, Jan. 12-16, 2009, 13 pages.
International Search Report and Written Opinion received for corresponding Patent Cooperation Treaty Application No. PCT/FI2009/050558, dated Mar. 5, 2010, 10 pages.
Finland Application No. 20086252, "Radio Receiver", filed on Dec. 30, 2008, 24 pages.
Office Action received for corresponding Chinese Application No. 200980160040.X, dated Sep. 6, 2013, 8 pages.

* cited by examiner

*Primary Examiner* — Dhaval Patel
(74) *Attorney, Agent, or Firm* — Nokia Corporation

(57) ABSTRACT

There is provided a solution for dual channel transmission in a radio communication device. Both transmission signals to be transmitted on different channels are mixed two times by using oscillator signals having the same frequencies for both transmission signals, and the transmission circuitry is arranged to process the signals so that the transmission signals are nevertheless up-converted to different frequency channels.

20 Claims, 3 Drawing Sheets

DUAL CHANNEL TRANSMISSION

RELATED APPLICATION

This application was originally filed as Patent Cooperation Treaty Application No. PCT/FI2009/050558 filed Jun. 23, 2009.

FIELD

The invention relates generally to dual channel transmission in a radio communication device.

BACKGROUND

In modern mobile communications, there is an ever increasing demand for higher data rates. In modern $3^{rd}$ generation cellular telecommunication systems, such as the UMTS (Universal Mobile Telecommunication System), data rates of High-speed Downlink/Uplink Packet Access (HS-DPA/HSUPA) have been increased by enabling the dual channel transmission. This technique is generally called a dual channel (DC) HSDPA or DC HSUPA, while sometimes it is referred to as dual cell HSDPA/HSUPA When considering DC HSUPA, a conventional mobile terminal requires two separate transmitter branches, one for each frequency channel. The use of two transmitters raises manufacturing costs and increases the size of the mobile terminal.

BRIEF DESCRIPTION OF EMBODIMENTS OF THE INVENTION

An object in an embodiment of the present invention is to transmit two radio frequency signals on parallel frequency channels simultaneously in a radio communication device.

According to an aspect of the invention, there is provided a method as specified in claim 1.

According to an aspect of the invention, there is provided an apparatus as specified in claim 14.

According to an aspect of the invention, there is provided a radio communication device as specified in claim 25.

According to an aspect of the invention, there is provided an apparatus as specified in claims 26.

According to an aspect of the invention, there is provided a computer program product as specified in claim 27.

Embodiments of the invention are defined in the dependent claims.

LIST OF DRAWINGS

In the following, the examples of the invention will be described in greater detail with reference to the embodiments and the accompanying drawings, in which FIG. 1 illustrates one transmission scenario to which embodiments of the invention may be applied;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
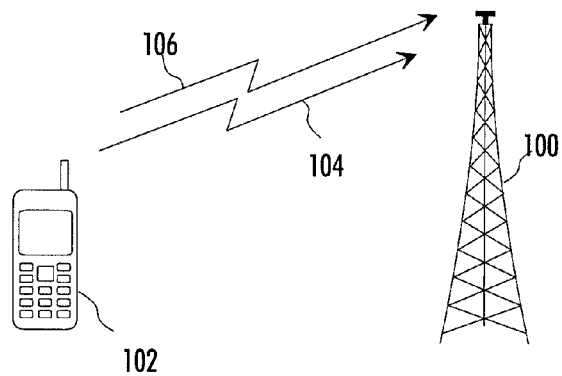

FIG. 1 illustrates a scenario where embodiments of the invention may be implemented. FIG. 1 illustrates a scenario where a mobile station 102 has been assigned with two uplink transmission channels 104 and 106 for communication with a base station 100 or multiple base stations. Such allocation is possible in high-speed uplink packet access (HSUPA) of the UMTS telecommunication system, for example. Other telecommunication systems and protocols may also apply dual channel transmission, e.g. GSM, GPRS, EDGE, and the embodiments of the invention are by no means limited to the UMTS system and its evolution versions including HSPA and long-term evolution (LTE). Furthermore, the dual channel transmission according to embodiments of the invention may also be applied in downlink where the base station is the transmitter. In some publications, the dual channel transmission is referred to as dual cell transmission. Naturally, the dual channel transmitter structure may also be applied to a scenario where the mobile station 102 communicates directly with another mobile station over a radio communication link not utilizing a fixed network infrastructure. The link may be a short-range radio link utilizing Bluetooth technology or a medium to long range radio link.

Figure 3A:
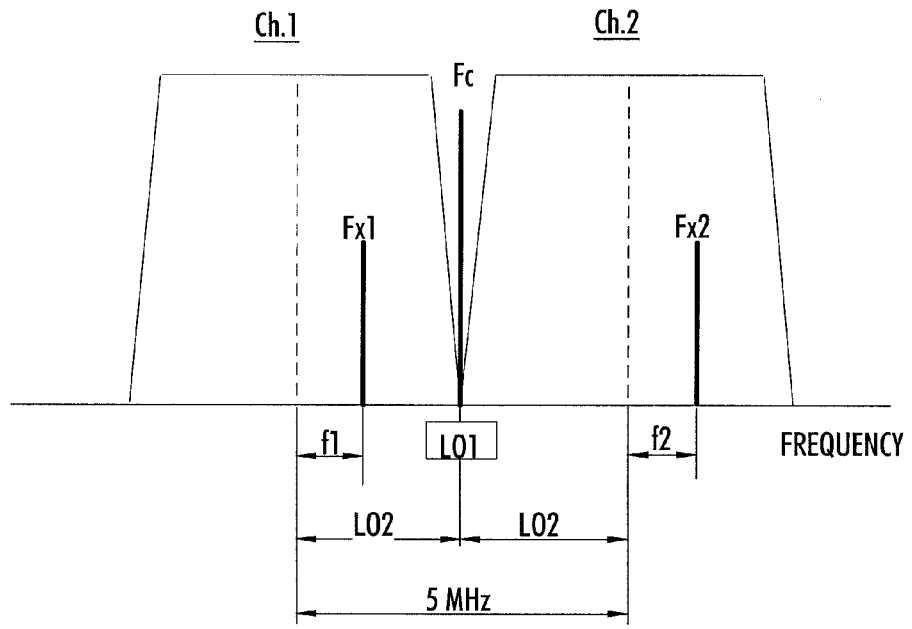
FIGS. 3A and 3B illustrate two examples of frequency allocation to which the transmission according to embodiments of the invention may be applied.
Figure 3B:
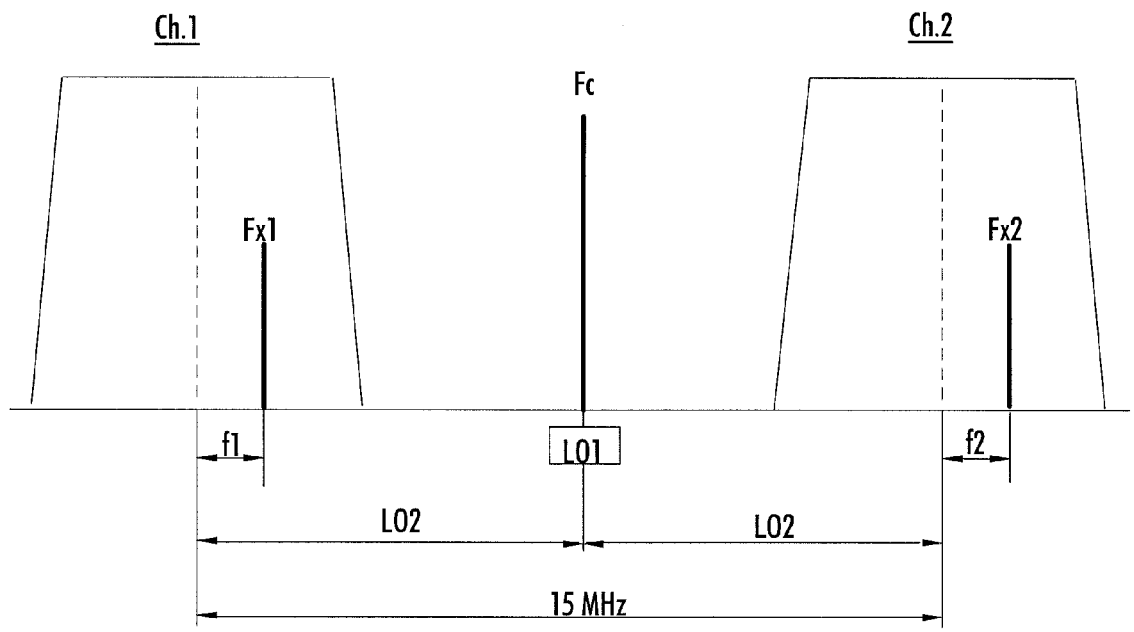

In the embodiments described herein, the two transmission channels 104 and 106 are separated in frequency, i.e. the transmission channels 104 and 106 occupy different frequency resources. FIGS. 3A and 3B illustrate two examples of the frequency occupation of the channels allocated to the mobile station 102. The channels may be adjacent (FIG. 3A) or they may be separated by one or more frequency channels not allocated to the mobile station (FIG. 3B). Referring to FIGS. 3A and 3B, let us define a center frequency Fc around which a first frequency channel and a second frequency channel are arranged symmetrically.

Let us consider a conventional solution in the form of a direct up-conversion transmitter when up-converting a transmission signal with a direct up-conversion transmitter circuitry, an oscillator signal carrying out the up-conversion typically has a frequency which corresponds to a center frequency of the frequency channel to be used in the transmission. Now that the number of transmission channels is two, two local oscillator signals each having a frequency corresponding to one of the center frequencies of the transmission channels would be needed according to a conventional solution. Such an approach has, however, disadvantages. For example, one would need two frequency synthesizers, one for each frequency channel. Additionally, the two local oscillator signals can easily mix with each other in the transmitter circuitry, resulting in various mixing components.

In an embodiment of the invention, the transmission signals to be transmitted simultaneously in a single radio frequency signal on the first and second frequency channels Ch1 and Ch2 are first frequency-converted with a first oscillator signal having a frequency which represents a frequency offset of the frequency channels from the center frequency Fc.

Then, the transmission signals are frequency-converted a second time with another oscillator signal having a frequency which corresponds to the center frequency. Embodiments of the invention described below show how it is arranged that the transmission signals appear on a correct frequency channel and not on a mirror frequency channel which is occupied by the other transmission signal.

Figure 2:
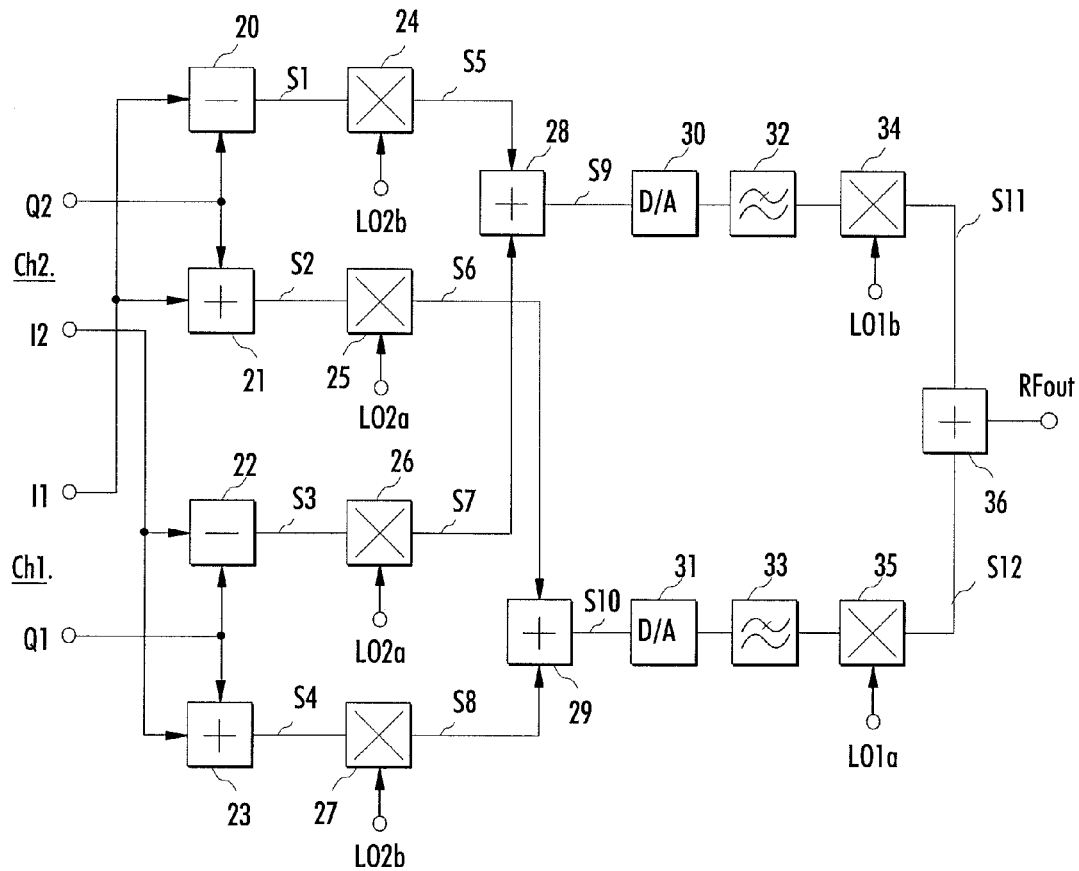
FIG. 2 shows a general architecture of an apparatus capable of transmitting two radio frequency signals on parallel frequency channels according to an embodiment of the invention.

FIG. 2 illustrates an example of a transmission circuitry applicable to a radio communication device according to an embodiment of the invention. The transmission circuitry described herein in connection with FIG. 2 thus forms an embodiment of an apparatus in accordance with the present invention. Another embodiment of the apparatus is a radio communication device comprising the transmission circuitry and other components, e.g. a user interface and/or a memory unit storing software and data. In this embodiment, the dual channel transmission is achieved by using a single transmitter chain instead of one for each frequency channel, thereby overcoming the problem of increased cost and size of the transmitter structure.

Referring to FIG. 2, the transmission circuitry receives a first transmission signal to be transmitted on a first frequency channel Ch1 and represented by its in-phase (I) component I1 and quadrature (Q) component Q1 and a second transmission signal to be transmitted on a second frequency channel Ch2 and represented by its I component I2 and Q component Q2. For the sake of simplicity, let us consider that the transmission signals are sinusoidal signals as:

$$I1=\sin(\omega_1 t)$$

$$Q1=\cos(\omega_1 t)$$

$$I2=\sin(\omega_2 t)$$

$$Q2=\cos(\omega_2 t), \quad (1)$$

where $\omega_1$ and $\omega_2$ represent angle frequencies of the sinusoidal signals. In FIGS. 3A and 3B, the first transmission signal is represented in an up-converted form by Fx1, and frequency offset f1 from a center frequency of the frequency channel Ch1 corresponds to the angle frequency $\omega_1=2\pi f1$. Similarly, the second transmission signal is represented in an up-converted form by Fx2, and f2 corresponds to the angle frequency $\omega_2=2\pi f2$. Equally, the first and second transmission signals may be of another type, e.g. a spread spectrum signal with a higher bandwidth, but that might obscure the description with unnecessary complexity. The transmission signals may be baseband signals having frequencies f1 and f2 of 1 MHz, for example.

The I and Q components of the first and second transmission signals are arranged in the transmission circuitry into a plurality of processing branches, as illustrated in FIG. 2. In the embodiment of FIG. 2, the I component I1 is applied to a first subtractor 20 and a first adder 21, the Q component Q1 is applied to a second subtractor 22 and a second adder 23, the I component I2 is applied to the second subtractor 22 and the second adder 23, and the Q component Q2 is applied to the first subtractor 20 and the first adder 21. As a result, we obtain intermediate signal components S1 to S4 as $$S1(t)=\sin(\omega_1 t)-\cos(\omega_2 t)$$

$$S2(t)=\sin(\omega_1 t)+\cos(\omega_2 t)$$

$$S3(t)=\sin(\omega_2 t)-\cos(\omega_1 t)$$

$$S4(t)=\sin(\omega_2 t)+\cos(\omega_1 t). \quad (2)$$

In other words, each processing branch at this stage comprises a signal component (either in-phase of quadrature component) from both the first and the second transmission signals. From another point of view, each I and Q component of both the first and second transmission signals is arranged into two processing branches.

Next, an intermediate signal on each processing branch is frequency-converted with an oscillator signal (LO2a or LO2b) having a first frequency which corresponds to the frequency offset of the frequency channels Ch1 and Ch2 from the center frequency Fc. In particular, the frequency offset may be defined as the (absolute) frequency difference between the center frequency of either frequency channel Ch1 or Ch2 and the center frequency Fc. Using the HSPA and FIG. 3A as an example, the bandwidth of each frequency channel is 5 MHz and, thus, the frequency of the oscillator signal LO2 is 2.5 MHz. A first intermediate signal S1 representing the difference between I1 and Q2 and a fourth intermediate signal S4 representing a sum of I2 and Q1 are frequency-converted with a first local oscillator signal LO2b. A second intermediate signal S2 representing the sum of I1 and Q2 and a third intermediate signal S3 representing a difference between I2 and Q1 are frequency-converted with a second local oscillator signal LO2b. The first and second oscillator signals LO2a and LO2b may have the same frequency but a phase difference of 90 degrees in order to arrange a phase difference between the same signal components in the different processing branches. In practice, the signal S1 output from the first subtractor 20 is applied to a first mixer 24 having the second oscillator signal LO2b as another input, and the resulting signal is denoted as S5. Signal S2 output from the first adder 21 is applied to a second mixer 25 having the first oscillator signal LO2a as another input, and the resulting signal is denoted as S6. Signal S3 output from the second subtractor 22 is applied to a third mixer 26 having the first oscillator signal LO2a as another input, and the resulting signal is denoted as S7. Signal S4 output from the second adder 23 is applied to a fourth mixer 27 having the second oscillator signal LO2b as another input, and the resulting signal is denoted as S8. The signals S5 to S8 obtained as a result of the frequency-conversion are defined as:

$$S5(t)=\cos(\omega_d t)[\sin(\omega_1 t)-\cos(\omega_2 t)]$$

$$S6(t)=\sin(\omega_d t)[\sin(\omega_1 t)+\cos(\omega_2 t)]$$

$$S7(t)=\sin(\omega_1 t)[\sin(\omega_2 t)-\cos(\omega_1 t)]$$

$$S8(t)=\cos(\omega_d t)[\sin(\omega_2 t)+\cos(\omega_1 t)], \quad (3)$$

where $\omega_d=2\pi f_d$ and $f_d$ represents the frequency LO2 of the oscillator signals LO2a and LO2b. Cos and sin components naturally represent the phase difference between the oscillator signals LO2a and LO2b.

Then, the frequency-converted intermediate signals S5 and S7 are summed together in a third adder 28 to form a first combined intermediate signal S9. Similarly, the frequency-converted intermediate signals S6 and S8 are summed together in a fourth adder 29 to form a second combined intermediate signal S10. The combined intermediate signals S9 and S10 are defined as:

$$S9(t) = \cos(\omega_d t)[\sin(\omega_1 t) - \cos(\omega_2 t)] + \qquad (4)$$
$$\sin(\omega_d t)[\sin(\omega_2 t) - \cos(\omega_1 t)]$$
$$= \cos(\omega_d t)\sin(\omega_1 t) - \cos(\omega_d t)\cos(\omega_2 t) +$$
$$\sin(\omega_d t)\sin(\omega_2 t) - \sin(\omega_d t)\cos(\omega_1 t)$$
$$= -\sin(\omega_d t - \omega_1 t) - \cos(\omega_d t + \omega_2 t)$$

$$S10(t) = \sin(\omega_d t)[\sin(\omega_1 t) + \cos(\omega_2 t)] + \qquad (5)$$
$$\cos(\omega_d t)[\sin(\omega_2 t) + \cos(\omega_1 t)]$$
$$= \sin(\omega_d t)\sin(\omega_1 t) + \sin(\omega_d t)\cos(\omega_2 t) +$$
$$\cos(\omega_d t)\sin(\omega_2 t) + \cos(\omega_d t)\cos(\omega_1 t)$$
$$= \sin(\omega_d t + \omega_2 t) + \cos(\omega_d t - \omega_1 t).$$

After the adding operations carried out in the adders 28 and 29, each combined intermediate signal S9 and S10 is converted from a digital domain into an analog domain in respective digital-to-analog converters 30 and 31. After the D/A conversion, the resulting analog signals are then low-pass filtered in low-pass filters 32 and 33 in order to smooth the D/A-converted signals by removing high-frequency components obtained as a result of the D/A conversion. Then, the D/A-converted combined intermediate signals are up-converted into the radio frequency used in the transmission. The first combined intermediate signal S9 is applied after the low-pass filtering to a fifth mixer 34 having a third oscillator signal LO1$b$ as another input. Similarly, the second combined intermediate signal S10 is applied after the low-pass filtering to a sixth mixer 35 having a fourth oscillator signal LO1$a$ as another input. The frequency of the third and fourth oscillator signals LO1$a$ and LO1$b$ corresponds to the center frequency Fc around which the first and second frequency channels are arranged in a frequency spectrum. The phase difference between the third and fourth oscillator signals LO1$a$ and LO1$b$ is again 90 degrees. As a result of the frequency-conversions carried out in the mixers 34 and 35, the following signals S11 (from mixer 34) and S12 (from mixer 35) are obtained:

$$S11(t) = \cos(\omega_c t)[-\sin(\omega_d t - \omega_1 t) - \cos(\omega_d t + \omega_2 t)] \qquad (6)$$

$$S12(t) = \sin(\omega_c t)[\sin(\omega_d t + \omega_2 t) + \cos(\omega_d t - \omega_1 t)]. \qquad (7)$$

After the frequency up-conversion, signals S11 and S12 are combined in a fifth adder 36 to produce an up-converted (radio frequency, RF) transmission signal RFout having the frequency-converted first transmission signal on the first frequency channel and the frequency-converted second transmission signal on the second frequency channel. After the adder 36, the transmission signal may be applied to a power amplifier, a filter and an antenna for transmission to a radio interface. The RF transmission signal RFout is obtained as the summation result as:

$$RFout(t) = \cos(\omega_c t)[-\sin(\omega_d t - \omega_1 t) - \cos(\omega_d t + \omega_2 t)] + \qquad (8)$$
$$\sin(\omega_c t)[\sin(\omega_d t + \omega_2 t) + \cos(\omega_d t - \omega_1 t)]$$

$$RFout(t) = \frac{1}{2}[\sin(\omega_c t - \omega_d t + \omega_1 t) + \sin(-\omega_c t - \omega_d t + \omega_1 t)] - \qquad (9)$$
$$\frac{1}{2}[\cos(\omega_c t + \omega_d t + \omega_2 t) + \cos(\omega_c t - \omega_d t - \omega_2 t)] -$$
$$\frac{1}{2}[\cos(\omega_c t + \omega_d t + \omega_2 t) - \cos(\omega_c t - \omega_d t - \omega_2 t)] +$$
$$\frac{1}{2}[\sin(\omega_c t - \omega_d t + \omega_1 t) + \sin(\omega_c t + \omega_d t - \omega_1 t)]$$

$$RFout(t) = \sin[(\omega_c - \omega_d + \omega_1)t] - \cos[(\omega_c + \omega_d + \omega_2)t]. \qquad (10)$$

As can be seen from Equation (10), the RF transmission signal RFout includes two components wherein the first component $\sin[(\omega_c - \omega_d + \omega_1)t]$ represents the first transmission signal (both in-phase and quadrature components) now frequency-converted from frequency f1 to frequency Fc−f$_d$+f1 which corresponds to the first frequency channel Ch1 in FIG. 3A. The second component $\cos[(\omega_c + \omega_d + \omega_2)t]$ represents the second transmission signal (both in-phase and quadrature components) now frequency-converted from frequency f2 to frequency Fc+f$_d$+f2 which corresponds to the second frequency channel Ch2 in FIG. 3A. As can be seen, the RF transmission signal RFout does not include mirror frequency components for either transmission signal. This is enabled by the phase manipulation in the transmission circuitry. Let us remind that signal components of each first and second transmission signal are included in two processing branches until the final combination in the fifth adder 36. The phases of the intermediate signals in the transmission circuitry are manipulated so that the same signal components related to the mirror frequency in the processing branches have opposite phases when the signal components are applied to the fifth adder 36. As a consequence, the signal components on the mirror frequencies and having opposite phases in the different processing branches negate each other in the summing process, where the branches are combined, and the mirror frequency is effectively cancelled.

In this case where the in-phase components lead the quadrature components, the up-converted transmission signals appear above the center frequencies of the frequency channels. However, the actual location of the transmission signals in the frequency channels is not of particular relevance, as long as they reside within the frequency channel. When actual transmission signals having a given bandwidth are used, the location and the bandwidth of the transmission signals may vary within the boundaries of the frequency channel.

In the example described above, the two frequency channels Ch1 and Ch2 are adjacent frequency channels (FIG. 3A). The same transmission circuitry may be used when the frequency channels are separated by one or more other frequency channels not allocated to the mobile station employing the transmission circuitry. Referring to FIGS. 2 and 3B, the higher (or an arbitrary) frequency separation between the frequency channels may be achieved by adjusting the frequency of the oscillator signals LO2$a$ and LO2$b$ input to the mixers 24 to 27. As can be seen from FIG. 3B, the frequency of this oscillator signal carrying out the first frequency conversion in the processing branches defines the frequency separation of the frequency channels Ch1 and Ch2. In the exemplary FIG. 3B, the frequency separation between the frequency channels allocated to the mobile station is 15 MHz, meaning that two other frequency channels may be allocated between Ch1 and Ch2. The higher frequency separation actually means that the intermediate signals S5 to S10 are located on a higher frequency than in the case of adjacent frequency channels. Therefore, when the transmission circuitry is configured to implement the higher frequency separation, the D/A converters 30 and 31 may be arranged to comply with higher bandwidth requirements. The order of the bandwidth requirement may be about a few dozen MHz, depending on the maximum frequency separation available in the radio spectrum or supported by the transmission circuitry of the mobile station.

Additionally, the bandwidth of the low-pass filters 32 and 33 may be widened to comply with the higher maximum frequency of the intermediate signals S5 to S10. Since the maximum bandwidth of the transmission signals remains constant regardless of the frequency separation of the frequency channels, a band below the frequency band of the intermediate signals S5 to S10 exists where no signal component is present. As a consequence, the low-pass filters 32 and 33 may be replaced by band-pass filters when the frequency channels are not adjacent in order to filter out spurious signal components below the effective band of the intermediate signals S9 and S10 input to the filters. The transmission circuitry may include both low-pass filters 32, 33 and band-pass filters (not shown), and the selection between the utilization of the low-pass filters 32, 33 and band-pass filters may be carried out by using switches controlled by a controller configured to select appropriate filters on the basis of whether adjacent or separated frequency channels are allocated to the mobile station. Alternatively, a single programmable filter may be provided, where filtering parameters (low-pass or band-pass property, bandwidth, pass-band and stop-band frequencies, etc.) are selected by the controller on the basis of the frequency separation between the frequency channels. The controller may obtain information on the frequency separation implicitly from a frequency of the oscillator signals LO2$a$/LO2$b$ or in an explicit signal received through an input interface of the controller. The same input signal may control a frequency synthesizer (not shown) to produce the signals LO2$a$ and LO2$b$ with desired frequency and the controller to select the transmission parameters for the filters.

Figure 4:
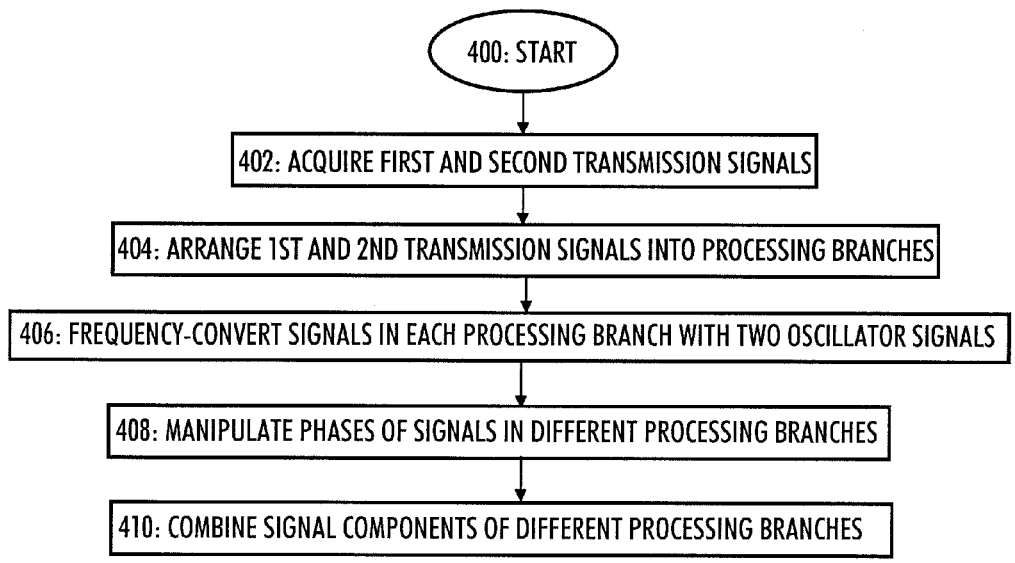
FIG. 4 illustrates a general method for performing the dual channel transmission according to an embodiment of the invention.
Figure 5:
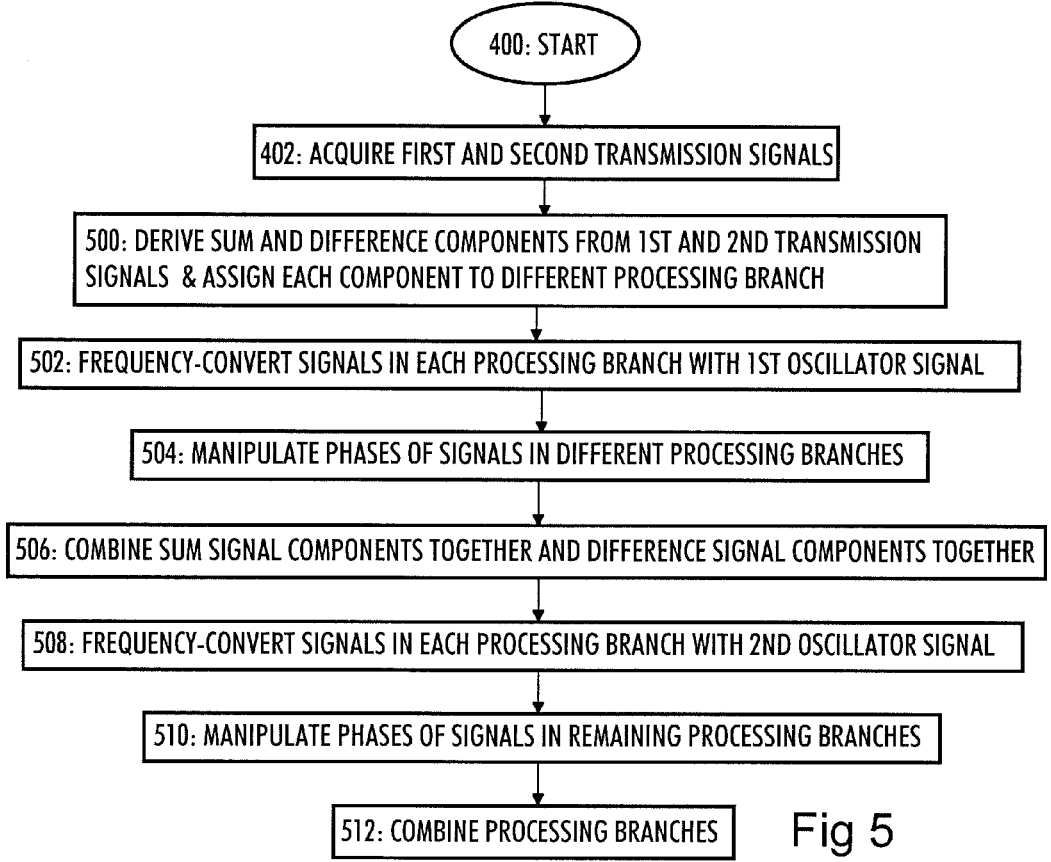
FIG. 5 illustrates a detailed method for performing the dual channel transmission according to an embodiment of the invention.

Let us now consider the operation of the transmission circuitry described above. The operation of the circuitry is described with reference to flow diagrams of FIGS. 4 and 5. FIG. 4 illustrates the operation in a general level so that the general idea of the operation of the circuitry can be appreciated, and FIG. 5 illustrates the operation in greater detail.

Referring to FIG. 4, the process starts in block 400. In block 402, a first and a second transmission signal is obtained. The first transmission signal is to be transmitted on a first frequency channel, and the second transmission signal is to be transmitted on a second frequency channel, wherein the first frequency channel and the second frequency channel are arranged symmetrically around a center frequency Fc.

In block 404, the first transmission signal and the second transmission signal are arranged into a plurality of processing branches, wherein each processing branch includes signal components of both the first transmission signal and the second transmission signal. In block 406, each signal component is frequency-converted first with an oscillator signal having a first frequency which corresponds to a frequency offset from the center frequency and again with another oscillator signal having a second frequency which corresponds to the center frequency. In other words, one oscillator signal having the first frequency and one oscillator signal having the second frequency is applied to each processing branch.

In block 408, phases of the signal components in different processing branches are manipulated so that the signal components of both first transmission signal and second transmission signal appearing on a mirror frequency channel as a result of the frequency-conversion with the oscillator signal having the second frequency have opposite phases in different processing branches. This has the result that in block 410, where the signal components in the different processing branches are combined, an up-converted transmission signal having the frequency-converted first transmission signal on the first frequency channel and the frequency-converted second transmission signal on the second frequency channel is obtained. The undesired mirror frequency components of both the first and the second transmission signals are effectively cancelled. The transmission circuitry described above in connection with FIG. 2 is an embodiment of an apparatus comprising the means for executing the process of FIG. 4.

Let us now study the operation of the transmission circuitry according to an embodiment of the invention in greater detail with reference to FIG. 5. In FIG. 5, blocks 400 and 402 may have the same functionality as the corresponding blocks in FIG. 4. In block 500, sum and difference components are derived from the first and second transmission signals. In practice, in-phase component of each transmission signal is summed with a quadrature component of the other transmission signal to obtain two sum components (signals) I1+Q2 and I2+Q1. On the other hand, the quadrature component of each transmission signal is subtracted from the in-phase component of the other transmission signal to obtain two difference components I1−Q2 and I2−Q1. Each sum and difference component is assigned to a different processing branch in the transmission circuitry. In this description, the sum and difference correspond to the respective intermediate signals S1 to S4 in FIG. 2.

In block 502, an oscillator signal having the first frequency corresponding is applied to each processing branch. In other words, each of the sum and difference components is up-converted to a frequency which corresponds to the frequency offset of the first and second frequency channels from the center frequency Fc. In block 504, the phases of the sum and difference components in different processing branches are manipulated. The manipulation may comprise arranging the sum component I1+Q2 and difference component I2−Q1 to have a phase which leads the phase of the sum component I2+Q1 and difference component I1−Q2 by 90 degrees (or $\pi/2$). In an embodiment, the phase manipulation may be carried out by arranging the phase difference in the oscillator signals having the first frequency. In another embodiment, the same oscillator signal having the first frequency is applied to every processing branch, and processing branches having the sum component I2+Q1 and difference component I1−Q2 include a delay component which delays the components I2+Q1 and I1−Q2 by $\pi/2$ to induce the phase difference.

In block 506, the sum and difference components are combined by summing sum signal components together (in adder 29) and difference signal components together (in adder 28). In block 508, the components in the combined processing branches are frequency-converted again. Each component is now up-converted by an oscillator signal having the second frequency corresponding to the center frequency Fc. In block 510, the phases of the components up-converted in block 508 are manipulated so that the same in-phase and quadrature components in different processing branches either have the same phase or opposite phase. In practice, the processing branch carrying the sum components is in this example manipulated to lead the phase of the processing branch carrying the difference components by 90 degrees (or $\pi/2$). As described in connection with block 504, the phase manipulation may be included in the phases of the oscillator signals applied to the different processing branches, or the processing branch carrying the difference components may be delayed by 90 degrees with a delay component. As a consequence, the phase manipulation may be carried out in connection with the frequency-conversion by applying the phase manipulation to the oscillator signals, or the phase manipulation may be carried out as separated from the frequency conversion.

In block 512, the processing branches carrying the sum and difference components are combined together. As a consequence, the same components having the same phase in different processing branches are summed together to form a transmission signal, and the same components having the opposite phases in different processing branches are summed together and cancelled. After block 512, the combined transmission signal is applied to an RF filter, a power amplifier, and an antenna.

The processes described above in connection with FIGS. 2, 4, and 5 may also be executed in a computer process implemented in an apparatus according to the embodiments of the present invention and defined by program instructions included in a computer program product. At least, the process may be controlled by a processor configured by suitable software. As can be seen from FIG. 2, the particular embodiment employs digital signal processing until the sum and difference signals have been summed respectively together in adders 28 and 29. In practice, it can be envisaged that the D/A conversion is carried out after the final combination of the processing branches in adder 36 which means that the whole process is executed in the digital domain and configured by software.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Above, the structure and operation of the transmission circuitry is described in accordance with a few embodiments of the invention. One skilled in the art appreciates that the transmission circuitry may include other functional components than these disclosed. The description of such components would obscure the embodiments of the invention with unnecessary details and, therefore, such description is omitted. It is equally obvious that a number of different practical implementations exists. For example, the processing in the digital domain described in connection with FIG. 3 may be replaced by analog processing techniques.

Efficient power control is an important factor in uplink transmission in the UMTS and HSPA. The communication device (mobile station) according to an embodiment of the invention may transmit both uplink frequency channels with the same transmission power, or a different transmission power may be applied to first and second transmission channels. The transmission power may be carried out by a transmission power control circuitry (not shown) configured to apply power control settings to the first and second transmission signals by adjusting the level of the I and Q signals in the transmission circuitry. The transmission power control settings may be determined on the basis of transmission power control commands received from a serving base station.

In the digital domain before the D/A converters, various different implementations exist depending on whether a given functionality is executed by hardware, software, or a combination of hardware and software. The embodiments of the invention described herein are described and illustrated as functional components and operations, and practical implementations may differ from what is disclosed. For example, the oscillator signals having the first frequency LO2a and LO2b may be produced from a single oscillator signal having the frequency of LO1 by means of digital signal processing or by means of analog frequency dividers instead of providing two independent oscillator signals with different frequencies. Furthermore, the mixers 24 to 27 may be replaced by a single multiplier structure implemented by hardware to which each signal (sum and difference) component is alternately applied. When considering the functionality of this operation, it corresponds to the situation where there is a separate mixer for each signal. Other alternative solutions can obviously be derived by one skilled in the art, and the scope of the present inventions should not be seen as limited by exemplary solutions described above.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
arranging, in a transmission circuitry, a first transmission signal to be transmitted on a first frequency channel and a second transmission signal to be transmitted on a second frequency channel, into a plurality of processing branches, wherein each processing branch includes signal components of both the first transmission signal and the second transmission signal, and wherein the first frequency channel and the second frequency channel are arranged symmetrically around a center frequency;
frequency-converting each signal component first with an oscillator signal having a first frequency which corresponds to a frequency offset from the center frequency and again with another oscillator signal having a second frequency which corresponds to the center frequency;
manipulating phases of the signal components in different processing branches so that the signal components of both the first transmission signal and the second transmission signal appearing on a mirror frequency channel as a result of the frequency-conversion with the oscillator signal having the second frequency have opposite phases in different processing branches; and
combining the signal components in the different processing branches, thereby obtaining an up-converted transmission signal having the frequency-converted first transmission signal on the first frequency channel and the frequency-converted second transmission signal on the second frequency channel.

2. The method according to claim 1, wherein each in-phase component and quadrature component of both the first and the second transmission signals are arranged in two processing branches until the processing branches are combined into the up-converted transmission signal.

3. The method according to claim 1, further comprising:
deriving a plurality of intermediate signals from the first transmission signal and the second transmission signal, wherein the plurality of intermediate signals comprise a sum signal and a difference signal of the in-phase and quadrature components of the first transmission signal and the second transmission signal; and
performing the frequency conversion, the phase manipulation, and combination on the intermediate signals.

4. The method according to claim 1, wherein the processing branches comprise a plurality of sum signals and a plurality of difference signals derived from the in-phase and quadrature components of the first transmission signal and the second transmission signal, the method further comprising:

arranging a 90-degree phase difference between the sum signals and a corresponding 90-degree phase difference between the difference signals resulting from the first frequency conversion;

summing the plurality of sum signals together to obtain a combined sum signal and the plurality of difference signals together to obtain a combined difference signal;

frequency-converting the combined sum signal and the combined difference signal with the oscillator signal having the second frequency;

arranging a 90-degree phase difference between the signals resulting from the frequency-conversion with the oscillator signal having the second frequency; and summing the frequency-converted and combined sum signal and the frequency-converted and combined difference signal.

5. The method according to claim 1, wherein the oscillator signal or oscillator signals having the first frequency define the frequency separation of the first frequency channel and the second frequency channel such that the frequency separation between center frequencies of the first frequency channel and the second frequency channel is substantially two times the first frequency.

6. The method according to claim 1, wherein the first frequency channel and the second frequency channel are adjacent frequency channels and wherein the first frequency is substantially half of the bandwidth of the first frequency channel.

7. The method according to claim 1, wherein the first frequency channel and the second frequency channel are separated by at least one frequency channel disposed between the first and second frequency channels.

8. The method according to claim 7, further comprising:
converting the signals in the processing branches from a digital domain to an analog domain in a digital-to-analog converter; and
filtering the digital-to-analog converted signals in a low-pass filter or a band-pass filter.

9. The method according to claim 7, further comprising:
converting the signals in the processing branches from a digital domain to an analog domain in a digital-to-analog converter; and
filtering the digital-to-analog converted signals in an adaptive filter having filtering parameters configured on the basis of the frequency separation between the first and second frequency channel.

10. The method according to claim 1, wherein the signals in the processing branches comprise a first sum signal comprising a sum of an in-phase component of the first transmission signal and a quadrature component of the second transmission signal, a second sum signal comprising a sum of an in-phase component of the second transmission signal and a quadrature component of the first transmission signal, a first difference signal indicating difference between the in-phase component of the first transmission signal and the quadrature component of the second transmission signal, and a second difference signal indicating the difference between the in-phase component of the second transmission signal and the quadrature component of the first transmission signal.

11. The method according to claim 1, wherein the phase manipulation is carried out when executing the frequency conversion.

12. The method according to claim 1, wherein the phase manipulation is carried out as separated from the execution of the frequency conversion.

13. The method according to claim 1, further comprising:
applying different transmission power control setting to the first transmission signal and the second transmission signal.

14. An apparatus comprising a transmission circuitry configured to:
arrange a first transmission signal to be transmitted on a first frequency channel and a second transmission signal to be transmitted on a second frequency channel, into a plurality of processing branches, wherein each processing branch includes signal components of both the first transmission signal and the second transmission signal, and wherein the first frequency channel and the second frequency channel are arranged symmetrically around a center frequency;

frequency-convert each signal component first with an oscillator signal having a first frequency which corresponds to a frequency offset from the center frequency and again with another oscillator signal having a second frequency which corresponds to the center frequency;

manipulate phases of the signal components in different processing branches so that the signal components of both the first transmission signal and the second transmission signal appearing on a mirror frequency channel as a result of the frequency-conversion with the oscillator signal having the second frequency have opposite phases in different processing branches; and combine the signal components in the different processing branches, thereby obtaining an up-converted transmission signal having the frequency-converted first transmission signal on the first frequency channel and the frequency-converted second transmission signal on the second frequency channel.

15. The apparatus of claim 14, wherein each in-phase component and quadrature component of both the first and the second transmission signals are arranged in two processing branches until the processing branches are combined into the up-converted transmission signal.

16. The apparatus according to claim 14, wherein the transmission circuitry is further configured to:
derive a plurality of intermediate signals from the first transmission signal and the second transmission signal, wherein the plurality of intermediate signals comprise a sum signal and a difference signal of the in-phase and quadrature components of the first transmission signal and the second transmission signal; and
perform the frequency conversion, the phase manipulation, and combination on the intermediate signals.

17. The apparatus according to claim 14, wherein the processing branches comprise a plurality of sum signals and a plurality of difference signals derived from the in-phase and quadrature components of the first transmission signal and the second transmission signal, and the transmission circuitry is further configured to:
arrange a 90-degree phase difference between the sum signals and a corresponding 90-degree phase difference between the difference signals resulting from the first frequency conversion;
sum the plurality of sum signals together to obtain a combined sum signal and the plurality of difference signals together to obtain a combined difference signal;
frequency-convert the combined sum signal and the combined difference signal with the oscillator signal having the second frequency;
arrange a 90-degree phase difference between the signals resulting from the frequency-conversion with the oscillator signal having the second frequency; and sum the frequency-converted and combined sum signal and the frequency-converted and combined difference signal.

18. The apparatus according to claim 14, further comprising a transmission power control circuitry configured to apply different transmission power control settings to the first transmission signal and the second transmission signal.

19. A radio communication device comprising the apparatus of claim 14 and a memory unit storing a computer program controlling the operation of the radio communication device.

20. A computer program product, embodied on a non-transitory computer-readable storage medium and comprising a program code which, when running on a processor, executes:

arranging, in a transmission circuitry, a first transmission signal to be transmitted on a first frequency channel and a second transmission signal to be transmitted on a second frequency channel, into a plurality of processing branches, wherein each processing branch includes signal components of both the first transmission signal and the second transmission signal, and wherein the first frequency channel and the second frequency channel are arranged symmetrically around a center frequency;

frequency-converting each signal component first with an oscillator signal having a first frequency which corresponds to a frequency offset from the center frequency and again with another oscillator signal having a second frequency which corresponds to the center frequency;

manipulating phases of the signal components in different processing branches so that the signal components of both the first transmission signal and the second transmission signal appearing on a minor frequency channel as a result of the frequency-conversion with the oscillator signal having the second frequency have opposite phases in different processing branches; and combining the signal components in the different processing branches, thereby obtaining an up-converted transmission signal having the frequency-converted first transmission signal on the first frequency channel and the frequency-converted second transmission signal on the second frequency channel.

* * * * *